(12) United States Patent
Slik et al.

(10) Patent No.: US 9,779,764 B2
(45) Date of Patent: *Oct. 3, 2017

(54) DATA WRITE DEFERRAL DURING HOSTILE EVENTS

(71) Applicant: NetApp, Inc., Sunnyvale, CA (US)

(72) Inventors: David Anthony Slik, Northridge, CA (US); Maxim Gerard Smith, Durham, NC (US); John William Haskins, Jr., Wake Forest, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,650

(22) Filed: Jul. 27, 2016

(65) Prior Publication Data

US 2016/0336028 A1 Nov. 17, 2016

Related U.S. Application Data

(63) Continuation of application No. 14/696,274, filed on Apr. 24, 2015, now Pat. No. 9,431,061.

(51) Int. Cl.
| | | |
|---|---|---|
| *G11B 27/36* | (2006.01) | |
| *G11B 5/09* | (2006.01) | |
| *G11B 20/12* | (2006.01) | |

(52) U.S. Cl.
CPC ............ *G11B 5/09* (2013.01); *G11B 20/1217* (2013.01); *G11B 27/36* (2013.01); *G11B 2020/1238* (2013.01); *G11B 2020/1292* (2013.01); *G11B 2220/2516* (2013.01)

(58) Field of Classification Search
CPC ..... G11B 5/59633; G11B 5/54; G11B 5/5547; G11B 27/36; G11B 5/012; G11B 5/59627; G11B 2220/20; G11B 27/11; G11B 5/596; G11B 33/08; G11B 23/043; G11B 33/121

USPC .......... 360/31, 60, 77.02, 75, 48, 78.04, 69, 360/78.09, 97.12, 97.19, 71, 55
See application file for complete search history.

(56) References Cited

U.S. PATENT DOCUMENTS

| | | |
|---|---|---|
| 4,543,654 A | 9/1985 | Jones |
| 6,115,200 A | 9/2000 | Allen et al. |
| 6,505,216 B1 | 1/2003 | Schutzman et al. |
| 6,714,371 B1 | 3/2004 | Codilian |
| 6,735,033 B1 | 5/2004 | Codilian et al. |
| 7,177,248 B2 | 2/2007 | Kim et al. |
| 7,333,282 B2 | 2/2008 | Iseri et al. |
| 7,408,732 B2 | 8/2008 | Kisaka et al. |
| 8,099,605 B1 | 1/2012 | Billsroem et al. |

(Continued)

FOREIGN PATENT DOCUMENTS

WO     2013152811 A1     10/2013

OTHER PUBLICATIONS

Rabin "Efficient Dispersal of Information for Security, Load Balancing, and Fault Tolerance," Journal of the Association for Computing Machinery, vol. 36, No. 2, Apr. 1989, pp. 335-348.

(Continued)

*Primary Examiner* — Nabil Hindi
(74) *Attorney, Agent, or Firm* — Gilliam IP PLLC

(57) ABSTRACT

Technology is disclosed for deferring storage operations (e.g., writes or reads) during hostile events. When a data storage device experiences a hostile event, e.g., a vibration, shock, etc. contact by a head of the data storage device with a disk surface can cause errors or indeed damage. The technology can cause a data storage device to suspend storage operations until the hostile event is no longer detected.

20 Claims, 6 Drawing Sheets

(56) References Cited

U.S. PATENT DOCUMENTS

| | | |
|---|---|---|
| 8,239,621 B2 | 8/2012 | Yamato |
| 8,819,259 B2 | 8/2014 | Zuckerman et al. |
| 8,838,911 B1 | 9/2014 | Hubin et al. |
| 8,949,449 B2 | 2/2015 | Zuckerman et al. |
| 8,959,281 B1 | 2/2015 | Malina et al. |
| 8,959,305 B1 | 2/2015 | Lecrone et al. |
| 8,990,162 B1 | 3/2015 | Kushwah et al. |
| 9,329,991 B2 | 5/2016 | Cohen et al. |
| 2004/0162940 A1 | 8/2004 | Yagisawa et al. |
| 2006/0271339 A1 | 11/2006 | Fukada |
| 2007/0104049 A1 | 5/2007 | Kim et al. |
| 2007/0156405 A1 | 7/2007 | Schulz et al. |
| 2007/0177739 A1 | 8/2007 | Ganguly et al. |
| 2007/0203927 A1 | 8/2007 | Cave et al. |
| 2008/0126357 A1 | 5/2008 | Casanova et al. |
| 2008/0151724 A1 | 6/2008 | Anderson et al. |
| 2008/0201336 A1 | 8/2008 | Yamato |
| 2008/0201401 A1 | 8/2008 | Pugh et al. |
| 2009/0100055 A1 | 4/2009 | Wang |
| 2009/0154559 A1 | 6/2009 | Gardner |
| 2009/0327840 A1 | 12/2009 | Moshayedi |
| 2010/0030960 A1 | 2/2010 | Kamalavannan et al. |
| 2010/0064166 A1 | 3/2010 | Dubnicki et al. |
| 2010/0094921 A1 | 4/2010 | Roy et al. |
| 2010/0094957 A1 | 4/2010 | Zuckerman et al. |
| 2010/0095060 A1 | 4/2010 | Strange et al. |
| 2010/0293354 A1 | 11/2010 | Perez et al. |
| 2011/0191629 A1 | 8/2011 | Daikokuya et al. |
| 2011/0296104 A1 | 12/2011 | Noda et al. |
| 2012/0060072 A1 | 3/2012 | Simitci et al. |
| 2013/0238235 A1 | 9/2013 | Kitchel et al. |
| 2014/0013046 A1 | 1/2014 | Corbett et al. |
| 2014/0108707 A1 | 4/2014 | Nowoczynski et al. |
| 2014/0207899 A1 | 7/2014 | Mark et al. |
| 2014/0237024 A1 | 8/2014 | Chen et al. |
| 2014/0297680 A1 | 10/2014 | Triou, Jr. et al. |
| 2014/0331085 A1 | 11/2014 | Dhuse et al. |
| 2014/0344532 A1 | 11/2014 | Lazier |
| 2015/0067245 A1 | 3/2015 | Kruger |
| 2015/0256577 A1 | 9/2015 | Gutiérrez Vilaró et al. |
| 2015/0378825 A1 | 12/2015 | Resch |
| 2016/0179621 A1 | 6/2016 | Schirripa et al. |
| 2016/0314043 A1 | 10/2016 | Slik |

OTHER PUBLICATIONS

Amer, et al., "Design Issue for a Shingled Write Disk System," 26th IEEE Symposium on Massive Storage Systems and Technologies (MSST 2010), May 2010,12 pages, retrieved on Oct. 20, 2015 from http://storageconference.us/2010/Papers/MSST/Amer.pdf.

Amer, et al.,"Data Management and Layout for Shingled Magnetic Recording," IEEE Transactions on Magnetics, Oct. 2011,vol. 47, No. 10, pp. 3691-3697, retrieved on Oct. 15, 2015 from http://www.ssrc.ucsc.edu/Papers/amer-ieeetm11.pdf.

Dunn, et al., "Shingled Magnetic Recording Models, Standardization, and Applications," SNIA Education, Storage Networking Industry Association, Sep. 16, 2014, 44 pages, retrieved on Oct. 21, 2015 from http://www.snia.org/sites/default/files/Dunn-Feldman_SNIA_Tutorial_Shingled_Magnetic_Recording-r7_Final.pdf.

Feldman, et al., "Shingled Magnetic Recording Areal Density Increase Requires New Data Management," USENIX, The Advanced Computing Systems Association, Jun. 2013, vol. 38, No. 3, pp. 22-30, retrieved on Oct. 20, 2015 from https://www.cs.cmu.edu/~garth/papers/05_feldman_022-030_final.pdf.

Gibson, et al., "Direction for Shingled-Write and Two-Dimensional Magnetic Recording System Architectures: Synergies with Solid-State Disks," Carnegie Mellon University, Parallel Data Lab, Technical Report CMU-PDL-09-104, May 2009, 2 pages, retrieved on Oct. 20, 2015 from http://www.pdl.cmu.edu/PDL-FTP/PDSI/CMU-PDL-09-104.pdf.

Gibson, et al., "Principles of Operation for Shingled Disk Devices," Carnegie Mellon University, Parallel Data Laboratory, CMU-PDL-11-107, Apr. 2011, 9 pages, retrieved on Oct. 20, 2015 from http://www.pdl.cmu.edu/PDL-FTP/Storage/CMU-PDL-11-107.pdf.

International Search Report and Written Opinion for Application No. PCT/US2015/048177 mailed on Dec. 10, 2015, 8 pages.

Li, X., "Reliability Analysis of Deduplicated and Erasure-Coded Storage," ACM SIGMETRICS Performance Evaluation Review, vol. 38, No. 3, ACM New York, NY, Jan. 3, 2011, pp. 4-9.

Luo, "Implement Object Storage with SMR based Key-Value Store," 2015 Storage Developer Conference, Huawei Technologies Co., Sep. 2015, 29 pages, retrieved on Oct. 20, 2015 from http://www.snia.org/sites/default/files/SDC15_presentations/smr/QingchaoLuo_Implement_Object_Storage_SMR_Key-Value_Store.pdf.

Megans, "Spectra Logic Announces Breakthrough in Nearline Disk, ArcticBlue," SPECTA Logic, Boulder, CO, Oct. 15, 2015, 5 pages, retrieved on Oct. 20, 2015 from https://www.spectralogic.com/2015/10/15/spectra-logic-announces-breakthrough-in-nearline-disk-arcticblue/.

O'Reily; J., "RAID Vs. Erasure Coding", Network Computing, Jul. 14, 2014, 2 pages, retrieved on Apr. 1, 2016 from http://www.networkcomputing.com/storage/raid-vs-erasure-coding/1792588127.

Renzoni, R., "Wide Area Storage From Quantum," Quantum Corporation, 2012, 24 pages.

Seshadri S., "High Availability and Data Protection with EMC Isilon Scale-Out NAS," EMC Corporation, White Paper, Jun. 2015, 37 pages, retrieved on Oct. 5, 2015 from https://www.emc.com/collateral/hardware/white-papers/h10588-isilon-data-availability-protection-wp.pdf.

SMR Layout Optimisation for XFS, Mar. 2015, v0.2, 7 pages, retrieved on Oct. 15, 2015 from http://xfs.org/images/f/f6/Xfs-smr-structure-02.pdf.

Speciale P., "Scality RING: Scale Out File System & Hadoop over CDMI," Scality, Storage Developer Conference, Sep. 19-22, 2014, 26 pages, retrieved on Oct. 5, 2015 from http://www.snia.org/sites/default/files/PaulSpeciale_Hadoop_Ring.pdf.

Suresh, et al., "Shingled Magnetic Recording for Big Data Applications," Parallel Data Laboratory, Carnegie Mellon University, Pittsburg, PA, CMU-PDL-12-105, May 2012, 29 pages, retrieved on Oct. 20, 2015 from http://www.pdl.cmu.edu/PDL-FTP/FS/CMU-PDL-12-105.pdf.

DATA WRITE DEFERRAL DURING HOSTILE EVENTS

RELATED APPLICATIONS

This application is a continuation application of and claims priority to U.S. patent application Ser. No. 14/696,274 filed on Apr. 24, 2015, the entirety of which is incorporated herein by reference.

TECHNICAL FIELD

Several of the disclosed embodiments relate to data storage, and more particularly, to data storage architecture for enhanced storage resiliency during hostile events.

BACKGROUND

Commercial enterprises (e.g., companies) and others gather, store, and analyze an increasing amount of data. The trend now is to store and archive almost all data before making a decision on whether or not to analyze the stored data. Although the per unit cost associated with storing data has declined over time, the total costs for storage has increased for many companies because of the volumes of stored data. Hence, it is important for companies to find cost-effective ways to manage their data storage environments for storing and managing large quantities of data.

In response, data storage drive (e.g., magnetic hard disk drive) manufacturers have increased data storage capacity by using various innovative techniques, including increasing the number of platters and the density of tracks and sectors on one or both surfaces of the platters. A platter is commonly a circular disk having one or both sides of a rigid substrate coated with a magnetic medium, on which data is stored. Data storage devices typically have several platters that are mounted on a common spindle. Each side on which data is stored commonly has an associated read head and a write head, or sometimes a common read/write head. The platters are rotated rapidly within the data storage device about the spindle, and an actuator moves heads toward or away from the spindle so that data can be written to or read from tracks. A track is a circular path on the magnetic surface of the platters. One way of increasing data storage capacity is to have very narrow tracks and to place heads very close to the surface of the platter, e.g., micrometers (also, "microns") away. However, because it takes more energy to write data than to read data (e.g., because the magnetic surface of platters must be magnetized to store data), data storage drive manufacturers inserted a buffer track between tracks storing data so that a wider track can be written to than read from. The buffer tracks could be magnetized when tracks on either side of the buffer tracks ("data tracks") were written to, but read heads would only read from data tracks and ignore buffer tracks. However, buffer tracks decrease available space on platters.

To avoid wasting space on buffer tracks, a new technique employed by the industry is shingled magnetic recording ("SMR"). SMR is a technique to increase capacity used in hard disk drive magnetic storage. Although conventional data storage devices as described above record data by writing non-overlapping magnetic tracks parallel to each other, SMR involves writing new tracks that overlap part of the previously written magnetic track, leaving the previous track thinner, thereby allowing for higher track density. The SMR tracks partially overlap in a manner similar to roof shingles on a house. Shingled magnetic recording is expected to increase hard disk capacity by about 25% as compared to non-shingled storage.

However, if there exist hostile environmental events, e.g., vibrations, mechanical shocks, etc., use of SMR could lead to increased data corruption as compared to existing write techniques because not only could data in the track being written to become corrupt, but possibly also data in previously written adjacent tracks.

DETAILED DESCRIPTION

Figure 1:
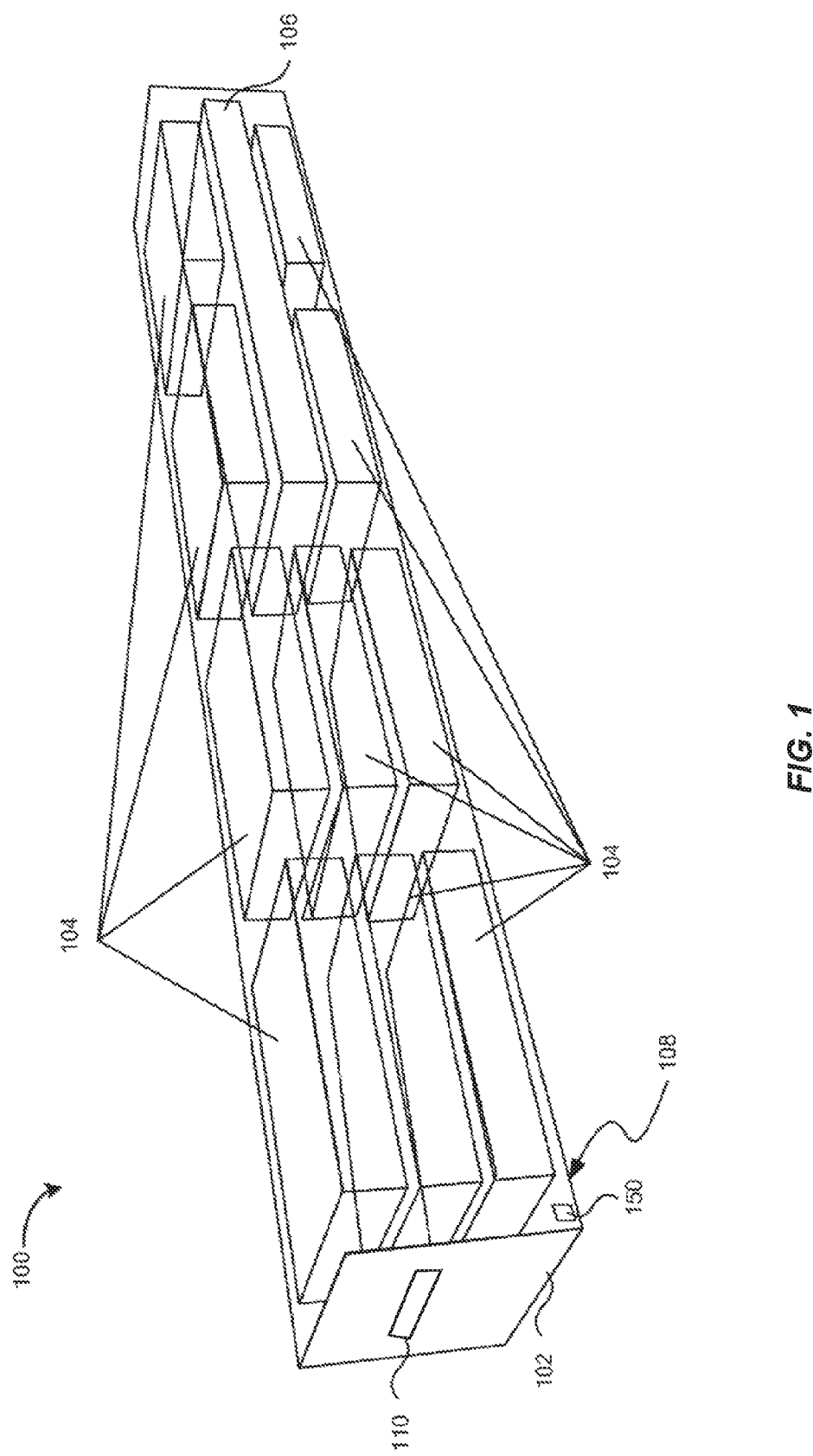
FIG. 1 is a perspective plan view of a storage shelf and components therein, consistent with various embodiments.

Technology is described for deferring write operations to be performed by a data storage system when hostile environmental conditions are detected. In various embodiments, the technology includes one or more sensors, e.g., vibration sensors, that detect a hostile environmental event, e.g., a vibration. When the vibration is detected, e.g., exceeding a specified threshold, a processor associated with the data storage system suspends write operations, e.g., until the event is no longer detected. In various embodiments, the hostile environmental conditions can be detected using various sensors, e.g., vibration sensors, accelerometers, or even moisture, electo-magnetic-field, or other environmental sensors. In typical use, vibration sensors and/or accelerometers can detect movement. When the detected movement exceeds a specified threshold, a processor associated with the data storage system can command one or more data storage devices to suspend pending write operations. For example, the processor can command all data storage devices that are proximate to one another, e.g., co-located in a cabinet, shelf, or rack of a data storage system, to suspend the write operations. In another example, the processor can command individual data storage devices that are proximate to the sensor that detected a hostile condition. The data storage system can temporarily store ("log") write operations it receives, e.g., in storage that is not susceptible to errors caused by vibration, e.g., in a system random access memory (e.g., non-volatile memory), solid state storage device, etc., e.g., while the write operations are suspended. After the environmental condition returns to a state not exceeding the threshold, e.g., an acceptable range, the data storage system can return to a normal state the data storage devices that had been commanded to suspend write operations, transfer the logged write operations to the data storage devices, and then continue to forward additional write operations to the data storage devices.

During the time that a data storage device has been commanded to suspend write operations, the data storage system may or may not be able to complete read operations.

As an example, if the processor detects that there is a risk that any operation could result in physical damage to a data storage device, e.g., because a head may come in physical contact with a platter, the processor can suspend all operations. On the other hand, if the processor detects that there is little risk that a read physical operation could result in physical damage to a data storage device, but a greater than normal risk that a write operation could result in error, the processor can suspend write operations, but continue with read operations. Thus, the technology may have three states of operation and different threshold values for environmental conditions that determine in which state to operate: (1) normal; (2) read only; or (3) neither read nor write.

In various embodiments, the technology can receive at the data storage system a command to perform a write operation; cause a data storage device to perform a write operation; detect, during the write operation performed by the data storage device, a signal indicating that a vibration is detected; suspend the write operation until the signal stops; and continue, after the signal stops, the write operation. The technology can suspend the write operation if the detected signal exceeds a specified threshold. As an example, if the vibration detector detects a vibration that exeeds a specified threshold, a processor can suspend write operations directed to an affected data storage device. As another example, if the vibration detector detects a vibration that exceeds a different specified threshold, e.g., a higher threshold value, the processor can suspend read and/or write operations directed to the affected data storage device. The data storage device can be a high capacity magnetic data storage device, e.g., a data storage device that employs very high density tracks and/or a shingled magnetic recording technique. In various embodiments, the technology may be employable with other types of data storage devices, e.g., optical disc drives, magnetic tape drives that write multiple tracks to tapes, etc.

In various embodiments, the sensor that detects environmental conditions, e.g., a vibration detector, may be associated with a device and/or software that provides ("exposes") an application program interface (also known as an "application programming interface," or simply as "API"). As an example, data storage devices commonly include an interface to enable attached devices (e.g., the data storage system with which the data storage device is associated) to receive commands, return data, indicate status, etc. Data storage devices having (or modified to have) an environmental condition sensor (e.g., vibration sensor, accelerometer, etc.) can employ this interface to indicate the detected environmental condition. As examples, the interface can raise a flag, cause an interrupt, or simply return a value indicating the present condition. In various embodiments, the application program interface can indicate a value or range for the environmental condition or can receive threshold values and indicate that a specified threshold value has been exceeded. One having ordinary skill in the art would understand that the application program interface can have various combinations of properties and methods.

In various embodiments, the environmental condition sensor (also referred to herein as detector) can be associated with a shelf of a data storage system. Cabinets of data storage systems typically have multiple shelves and each shelf typically has multiple data storage devices. When a first shelf associated with a data storage system experiences a risky environmental condition but a second shelf does not, a processor associated with the data storage system can command all data storage devices of the first shelf to suspend read and/or write operations but not transmit that command to data storage devices of the second shelf. In various embodiments, the environmental condition sensor can be associated with an entire cabinet. In such embodiments, the data storage system may suspend operations to all data storage devices of the cabinet.

The storage devices of the storage system can be organized as storage shelves and storage racks, where each storage rack includes a number of storage shelves and each storage shelf includes a number of storage devices. The storage racks/shelves/devices can be distributed across various geographical locations.

Environment

FIG. 1 is a perspective plan view of a storage shelf 100 and components therein, consistent with various embodiments. The storage shelf 100 includes an enclosure shell 102 (partially shown) that encloses and protects multiple data storage devices 104. The data storage devices 104 may be hard drives, solid-state drives, flash drives, tape drives, or any combination thereof. It is noted that the term "enclose" does not necessarily require sealing the enclosure and does not necessarily require enveloping all sides of the enclosure.

The storage shelf 100 further includes control circuitry 106 that manages the power supply of the storage shelf 100, the data access to and from the data storage devices 104, and other storage operations to the data storage devices 104. The control circuitry 106 may implement each of its functions as a single component or a combination of separate components.

As shown, the storage shelf 100 is adapted as a rectangular prism that sits on an elongated surface 108 of the rectangular prism. Each of the data storage devices 104 may be stacked within the storage shelf 100. For example, the data storage devices 104 can stack on top of one another into columns. The control circuitry 106 can stack on top of one or more of the data storage devices 104 and one or more of the data storage devices 104 can also stack on top of the control circuitry 106.

In various embodiments, the enclosure shell 102 encloses the data storage devices 104 without providing window openings to access individual data storage devices or individual columns of data storage devices. In these embodiments, each of the storage shelves 100 is disposable such that after a specified number of the data storage devices 104 fail, the entire storage shelf 100 can be replaced as a whole instead of replacing individual failed data storage devices 104. Alternatively, the storage shelf 100 may be replaced after a specified time, e.g., corresponding to an expected lifetime.

The illustrated stacking of the data storage devices 104 in the storage shelf 100 enables a higher density of standard disk drives (e.g., 3.5-inch disk drives) in a standard shelf (e.g., a 19-inch width rack shelf). Each storage shelf 100 can store ten of the standard disk drives. In the cases that the data storage devices 104 are disk drives, the storage shelf 100 can hold the disk drives "flat" such that the spinning disks are parallel to the gravitational field.

The storage shelf 100 may include a handle 110 on one end of the enclosure shell 102 and a data connection port 112 (not shown) on the other end. The handle 110 is attached on an outer surface of the enclosure shell 102 to facilitate carrying of the storage shelf 100. The enclosure shell 102 exposes the handle 110 on its front surface. For example, the handle 110 may be a retractable handle that retracts to fit next to the front surface when not in use.

In some embodiments, the storage shelf 100 can include a sensor component 150 that is configured to detect environmental conditions and transmit indications of the detected environmental conditions, e.g., to a processor (not illustrated). Examples of the sensor component can include, e.g., a vibration sensor or detector, accelerometer, etc. The sensor component can include other electrical, mechanical, and/or electromechanical structures or sub-components, e.g., to sense hostile environmental conditions and communicate the detected conditions.

Figure 2:
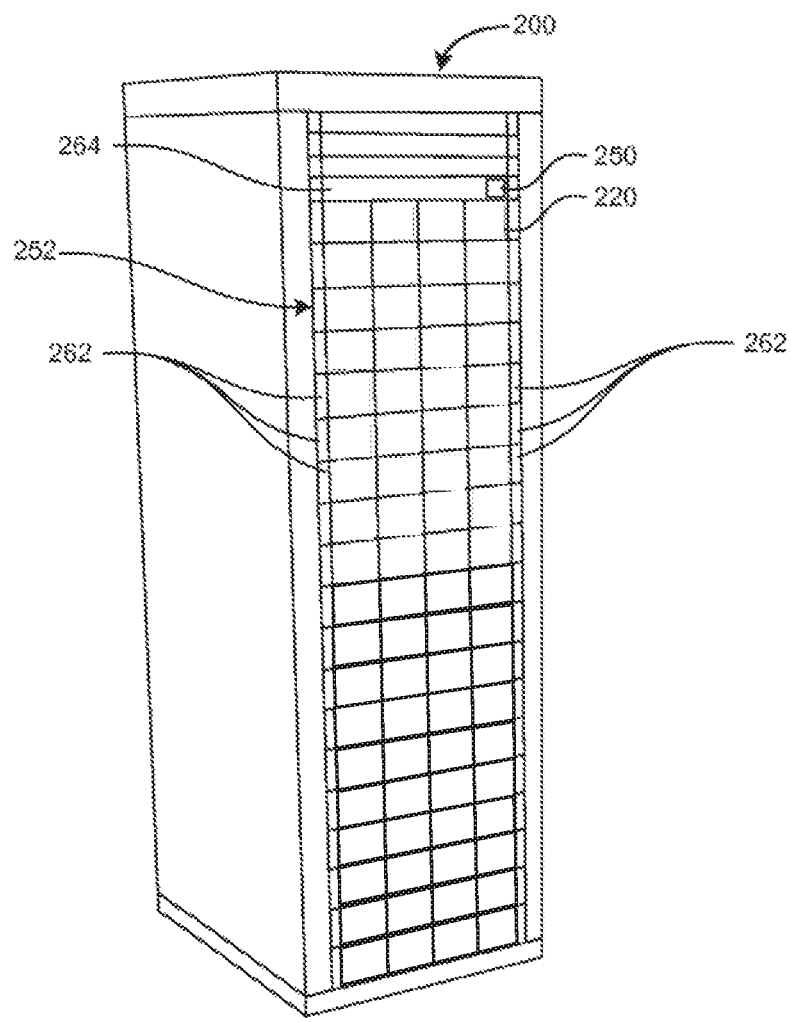
FIG. 2 is a perspective view of a storage rack of storage shelves, consistent with various embodiments.

FIG. 2 is a perspective view of a storage rack 200 of storage shelves 220, consistent with various embodiments. The storage shelves 220 may be instances of the storage shelf 100 illustrated in FIG. 1. The storage rack 200, as illustrated, includes a tray structure 252 (e.g., a rack shelf) each securing four instances of the storage shelf 220. The tray structure 252 can be a standard 2U 19-inch deep rack mount. The storage rack 200 may include a stack of tray structures 252, each securely attached to a set of rails 262. Management devices 264 may be placed at the top shelves of the rack 200. For example, the management devices 264 may include network switches, power regulators, front-end storage appliances, or any combination thereof.

In some embodiments, the rack 200 can include a sensor component 250 that is configured to detect environmental conditions and transmit indications of the detected environmental conditions, e.g., to a processor (not illustrated). Examples of the sensor component 250 can include, e.g., a vibration sensor or detector, accelerometer, etc. The sensor component 250 can include other electrical, mechanical, and/or electromechanical structures or sub-components, e.g., to sense hostile environmental conditions and communicate the detected conditions.

Figure 3:
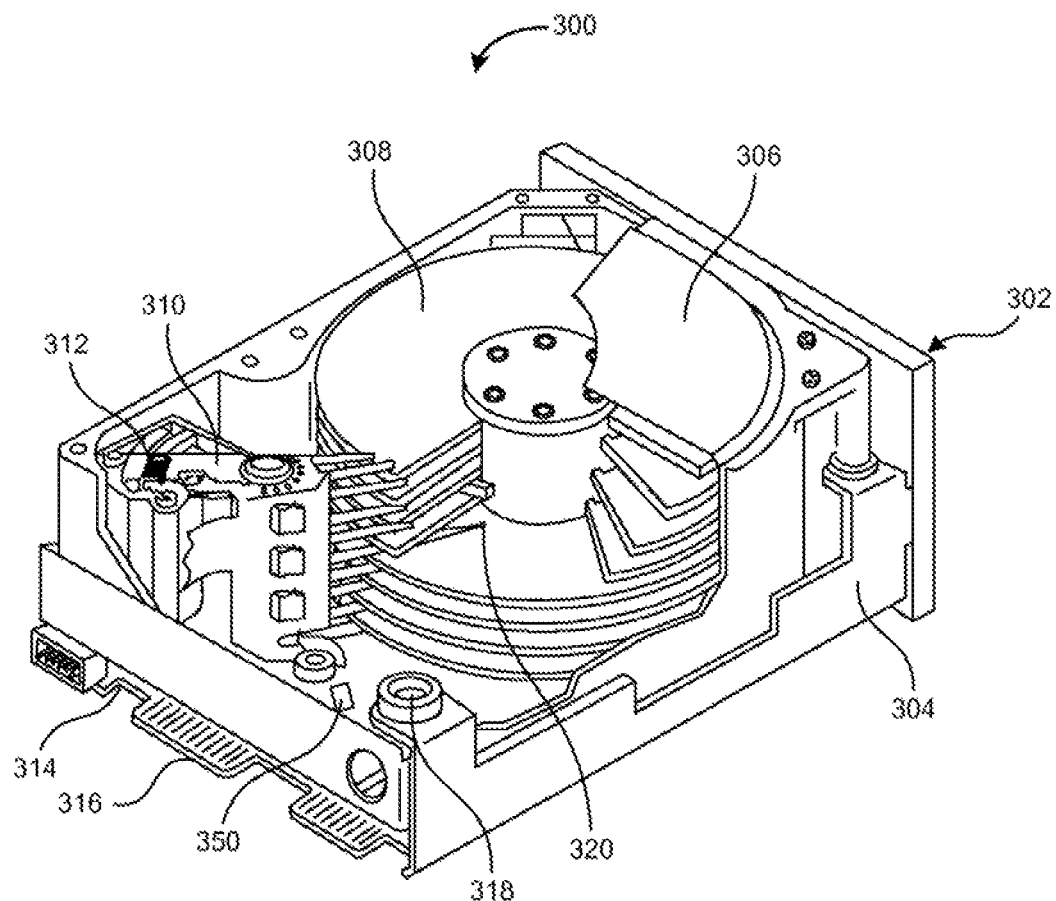
FIG. 3 is a perspective plan view of internal components of a data storage device, in accordance with various embodiments.

FIG. 3 is a perspective plan view of internal components of a data storage device 300, in accordance with various embodiments. The data storage device can be a conventional hard disk storage device with the addition of a sensor component 350 that is configured to detect environmental conditions and transmit indications of the detected environmental conditions, e.g., to a processor (not illustrated). Examples of the sensor component 350 can include, e.g., a vibration sensor or detector, accelerometer, etc. The sensor component 350 can include other electrical, mechanical, and/or electromechanical structures or sub-components, e.g., to sense hostile environmental conditions and communicate the detected conditions.

The standard components of a hard disk data storage device are also illustrated: a front bezel 302 is attached to a mounting chassis 304. Also attached to the mounting chassis 304 can be a sealed chamber 306, an antivibration mount 318, a printed circuit board 314, and various electrical connectors 316. Although an "IDE" type connector is illustrated, one skilled in the art will recognize that other connector types are also currently employed, e.g., SATA, SAS, SCSI, and so forth. The sealed chamber 306 can include one or more disk platters 308, a head arm 310, and a head actuator 312. Other embodiments may include multiple of these components. Attached to the head arm 310 can be multiple read/write heads 320, e.g., one per readable/writable surface of the disk platter 308.

Figure 4:
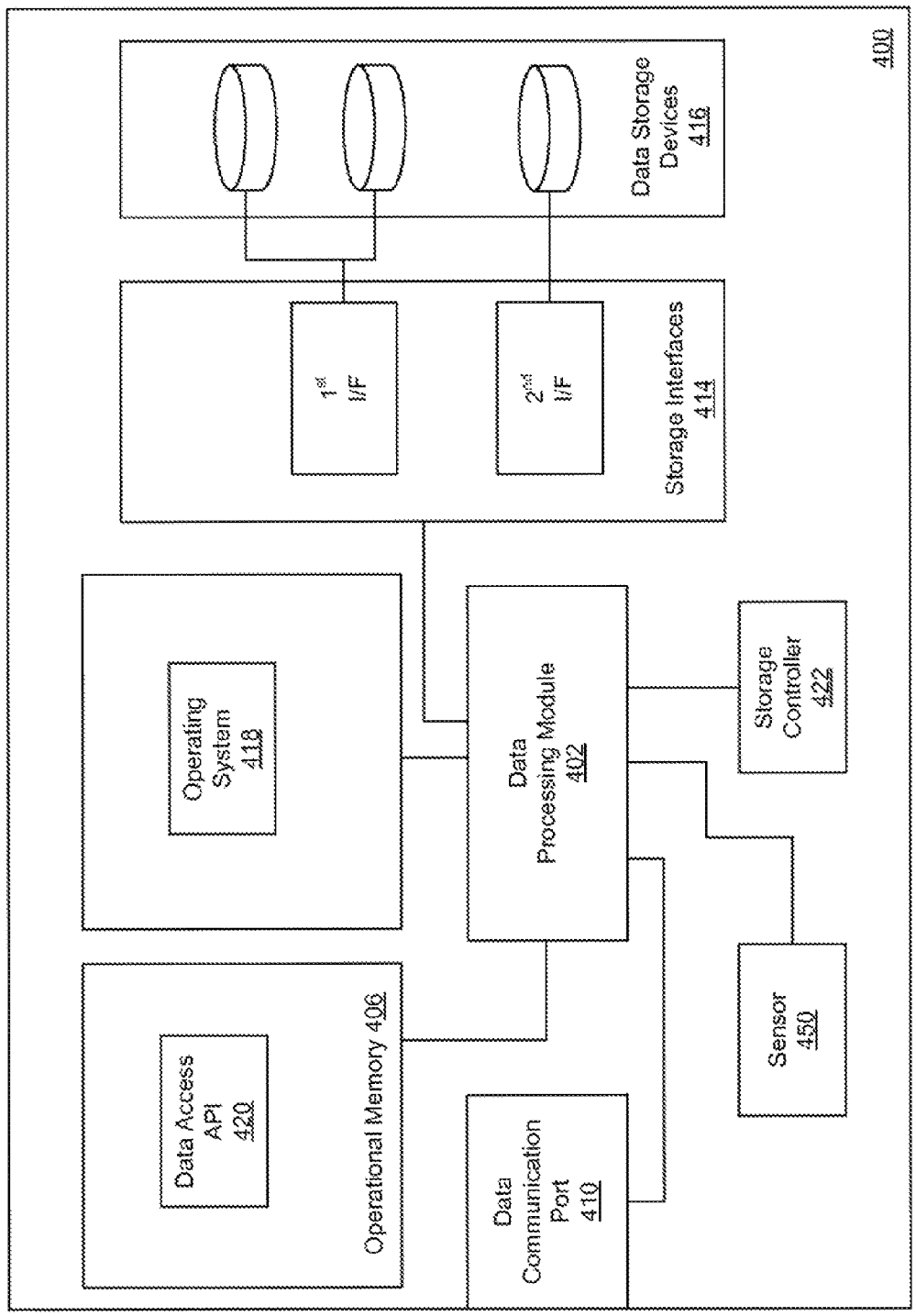
FIG. 4 is a block diagram illustrating components of a storage system, in accordance with various embodiments.

FIG. 4 is a block diagram illustrating components of a storage system 400, in accordance with various embodiments. The storage system 400 can include a data communication port 410 via which it receives various data communication commands. In some embodiments, the storage system 400 can include multiple data communication ports 410. A data processing module and or processor 402 can work in conjunction with an operating system 418 to analyze information received via the data communication port 410 or to be transmitted via the data communication port 410. The data processing module 402 may store data and instructions in an operational memory 406. The instructions can include an application program interface (API) 420. A storage controller 422 may function with the data processing module 402, via storage interfaces 414, to send commands to data storage devices 416, e.g., to store or retrieve data. This storing and retrieving may be performed in response to commands received via the data access API 420 or internal "housekeeping" commands. The storage system 400 can include a sensor component 450 that is configured to detect environmental conditions and transmit indications of the detected environmental conditions, e.g., to a processor. In various embodiments, the data processing module 402 can execute on the processor, or indeed be the processor. Examples of the sensor component can include, e.g., a vibration sensor or detector, accelerometer, etc. The sensor component 450 can include other electrical, mechanical, and/or electromechanical structures or sub-components, e.g., to sense hostile environmental conditions and communicate the detected conditions. In addition, or alternatively, the storage system 400 can receive indications of environmental conditions from remote sensors, e.g., sensors 150, 250, or 350. In some embodiments, the storage system 400 can include software and/or hardware components to temporarily suspend activities performed by the data storage devices 416, e.g., in response to hostile environmental conditions.

Figure 5:
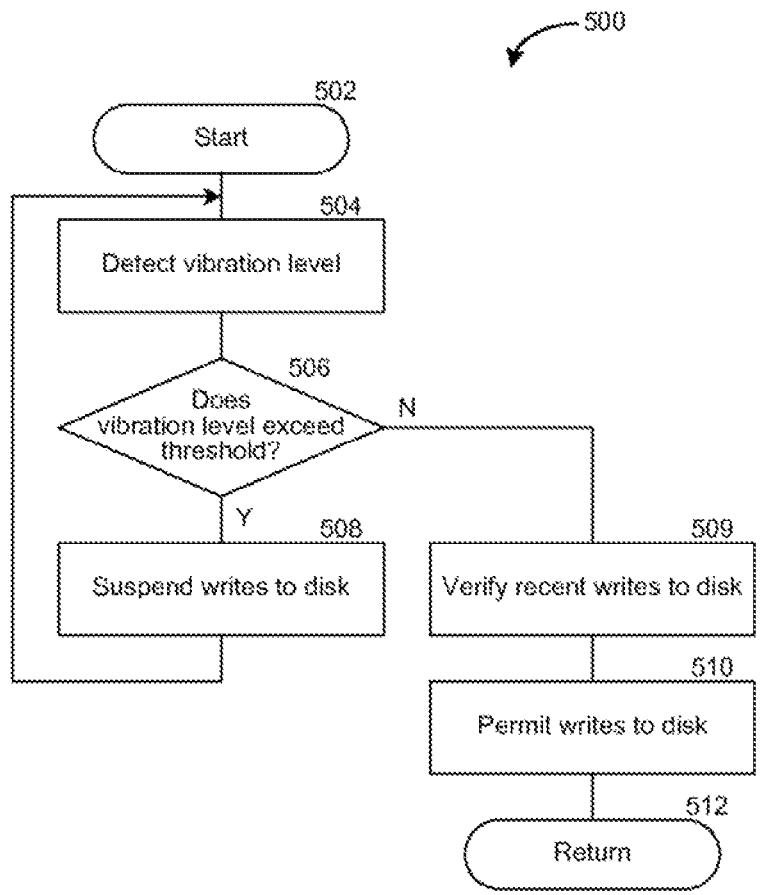
FIG. 5 is a flow diagram of a process of storing data, consistent with various embodiments of the disclosed technology.

FIG. 5 is a flow diagram of a process 500 of storing data, consistent with various embodiments of the disclosed technology. In some embodiments, the process 500 may be implemented in environment 400 of FIG. 4, e.g., by sensor component 450 or by data processing module 402. The process 500 begins at block 502. At block 504, the process 500 detects a vibration level or other environmental condition (also, "hostile" condition). At decision block 506, the process 500 determines whether the detected vibration level exceeds a specified threshold (or the detected environmental condition indicates a hostile environment). If so, the process 500 continues at block 508. Otherwise, the process 500 continues at block 509. At block 508, the process 500 suspends writes at one or more data storage devices. The process then returns to block 504. At block 509, the routine 500 verifies recent writes to disk. As an example, after the hostile environmental condition ends, the routine 500 can verify that data previously attempted to be written was written correctly. If not, the routine 500 may cause data to be written from a log stored in non-volatile memory (not illustrated). At block 510, the process 500 permits writes at one or more data storage devices and then returns at block 512. As would be recognized by one having ordinary skill in the art, the logic described above can be rearranged, executed in parallel or in a thread, etc. Similar logic can be applied to suspend read operations when a vibration or other hostile condition is detected. In such a case, block 509 may be reconfigured to ensure that data that was nearby the head when the hostile condition was detected remains intact (e.g., to ensure that the head did not physically contact the disc and cause damage to the portions storing data).

In various embodiments, the system may take different actions depending on which of multiple data storage devices is affected by the hostile condition. For example, operations can be suspended for affected data storage devices, but not unaffected data storage devices. Alternatively, operations can be redirected from affected data storage devices to unaffected data storage devices, e.g., write operations or read operations when data is redundantly available. One skilled in the art will recognize that other variations are possible.

Figure 6:
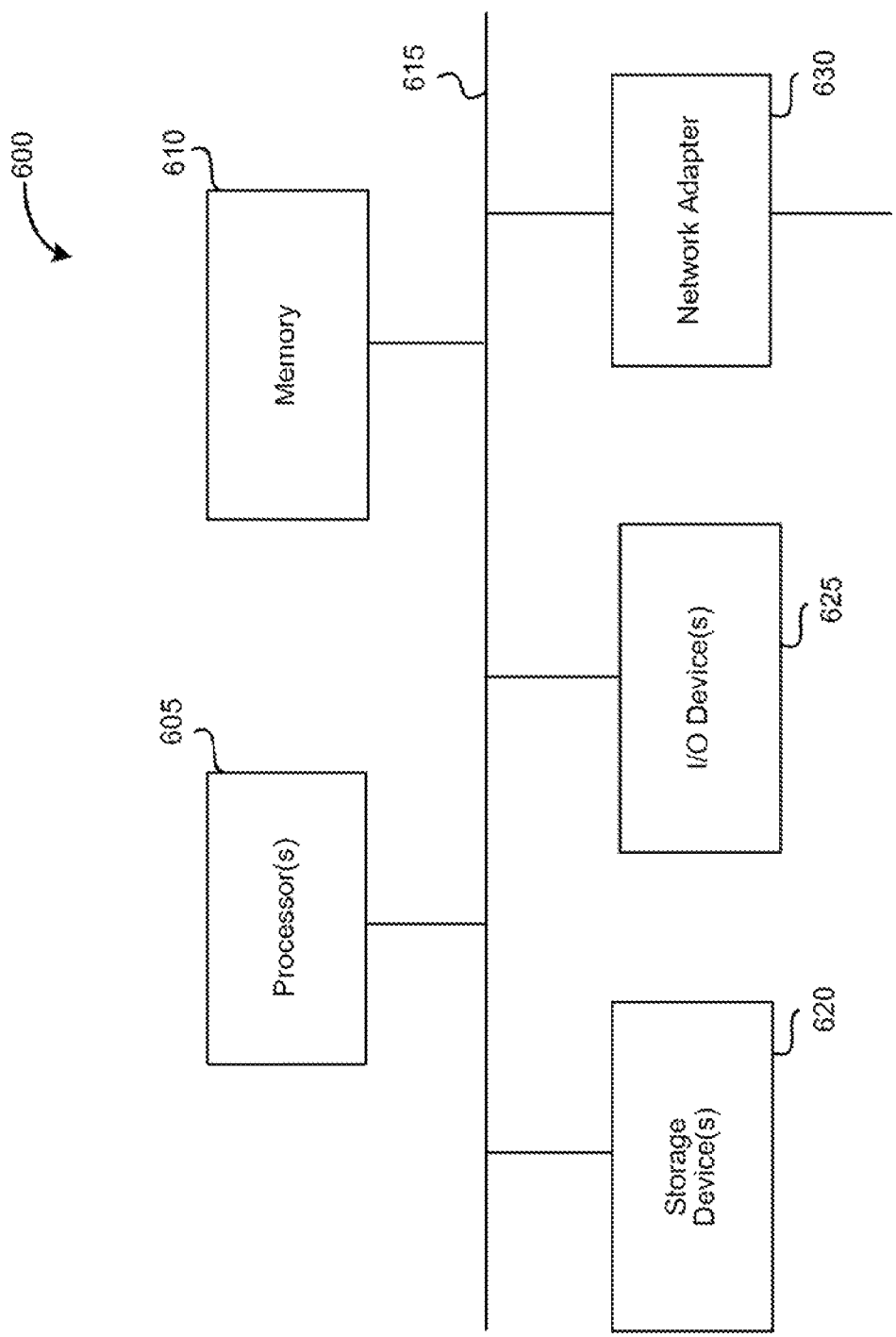
FIG. 6 is a block diagram of a computer system as may be used to implement features of some embodiments of the disclosed technology.

FIG. 6 is a block diagram of a computer system as may be used to implement features of some embodiments of the disclosed technology. The computing system 600 may be used to implement any of the entities, components or services depicted in the examples of the earlier figures (and any other components described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 610 can be implemented as software and/or firmware to program the processor(s) 605 to carry out actions described above. In some embodiments, such software and/or firmware may be initially provided to the computing system 600 by downloading it from a remote system to the computing system 600 (e.g., via network adapter 630).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Some terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method comprising:
   detecting, at a data storage system comprising a first and a second data storage devices, a command to perform a write operation to at least one of the first and second data storage devices;
   initiating the write operation;
   detecting, while the write operation is pending, a signal indicating that a hostile event is detected;
   based on detecting the signal, determining that the hostile event affects the first data storage device but not the second data storage device;
   based on determining that the write operation is to the first data storage device,
     suspending the write operation during detection of the signal; and
     continuing the write operation to the first data storage device, after the signal is no longer detected; and
   based on determining that the write operation is to the second data storage device, continuing the write operation during detection of the signal.

2. The method of claim 1, wherein detecting the signal comprises detecting the signal in response to a result of the hostile event exceeding a threshold.

3. The method of claim 1, further comprising:
detecting commands to perform operations to access the first data storage device while the write operation is suspended,
based on detecting the commands to perform operations to access the first data storage device while the write operation is suspended, logging the commands in a memory; and
after the signal is no longer detected, performing the operations that were logged in the memory.

4. The method of claim 1, further comprising:
determining that the hostile event affects a first shelf of the data storage system and not a second shelf of the data storage system, wherein the first data storage device is in the first shelf and the second data storage device is in the second shelf; and
suspending write operations to all data storage devices in the first shelf based, at least in part, on determining that the hostile even affects the first shelf.

5. The method of claim 1, further comprising:
determining that the first data storage device is proximate to a sensor that generated the signal, wherein suspending the write operation to the first data storage devices is based, at least in part, on determining that the first data storage device is proximate to the sensor.

6. The method of claim 1, wherein the first data storage device comprises a Shingled Magnetic Recording storage device.

7. The method of claim 1, wherein the second data storage device comprises a Shingled Magnetic Recording storage device.

8. The method of claim 1 further comprising:
determining that a value representing the hostile event exceeds a first threshold but not a second threshold,
wherein suspending the write operation and not a read operation directed to the first data storage device is based, at least in part, on determining that the value exceeds the first threshold but not the second threshold.

9. The method of claim 1 further comprising:
determining that a value representing the hostile event exceeds a first threshold and a second threshold; and
suspending a read operation directed to the first data storage device as well as the write operation based, at least in part, on determining that the value exceeds the first threshold and the second threshold.

10. A data storage system comprising:
at least one shelf configured to house first and second data storage devices;
a sensor component configured to,
  detect a vibration during a period comprising at least one of before and during a write operation;
  determine which of the data storage devices the vibration affects;
  transmit a signal in response to detection of the vibration, wherein the signal includes an indication of the data storage device affected by the vibration;
a processor;
a computer-readable medium comprising instructions executable by the processor to cause the data storage system to,
  determine that the write operation is to the affected data storage device;
  based on a determination that the write operation is to the affected data storage device,
    suspend the write operation during detection of the signal; and
    continue the write operation to the other data storage device that is not affected by the vibration, after the signal is no longer detected; and
  based on a determination that the write operation is to the data storage device not affected by the vibration, continue the write operation during detection of the signal.

11. The data storage system of claim 10, wherein the sensor component configured to detect the vibration is a sensor component of at least one of the first and second data storage devices.

12. The data storage system of claim 10, wherein the sensor component is configured to transmit the signal in response to the vibration exceeding a threshold.

13. The data storage system of claim 10, wherein the at least one shelf comprises first and second shelves, wherein the first shelf is configured to house the first data storage device and the second shelf is configured to house the second data storage device.

14. The data storage system of claim 10, wherein a same shelf of the at least one shelf is configured to house the first and second data storage devices.

15. The data storage system of claim 10, wherein the first and second data storage devices comprise Shingled Magnetic Recording storage devices.

16. A non-transitory machine readable medium having stored thereon instructions for storage access deferral, the non-transitory machine readable medium comprising machine executable code which when executed by at least one machine, causes the at least one machine to:
determine whether a value for a hostile environmental event satisfies a first threshold;
determine a first set of one or more data storage devices affected by the hostile environmental event;
based on a determination that the value satisfies the first threshold, suspend writes directed to the first set of one or more data storage devices until detection that the hostile environmental event ends and permit writes directed to a second set of one or more data storage devices, wherein a data storage system comprises the first and the second sets of one or more data storage devices;
during suspension of writes directed to the first set of one or more data storage devices, log received writes directed to the first set of one or more data storage devices;
permit writes directed to the first set of one or more data storage devices based, at least in part, on a determination that the hostile environmental event has ended; and
transfer logged writes to the first set of one or more data storage devices after determination that the hostile environmental event has ended.

17. The non-transitory machine readable medium of claim 16, further comprising machine executable code which when executed by the at least one machine, causes the at least one machine to permit reads directed to the first set of one or more data storage devices while writes are suspended based, at least in part, on a determination that the value does not satisfy a second threshold.

18. The non-transitory machine readable medium of claim 16, further comprising machine executable code which when executed by the at least one machine, causes the at least one machine to also suspend reads directed to the first set of one or more data storage devices based, at least in part, on a determination that the value satisfies a second threshold as well as the first threshold.

19. The non-transitory machine readable medium of claim 16, wherein the machine executable code, which when executed by the at least one machine, causes the at least one machine to determine the first set of one or more data storage devices affected by the hostile environmental event comprises machine executable code to determine that the hostile environmental event affects a first shelf of a plurality of shelves of the data storage system and determine that the first set of one or more data storage devices are on the first shelf and that the second set of one or more data storage devices is on a second shelf of the plurality of shelves.

20. The non-transitory machine readable medium of claim 16, wherein the machine executable code, which when executed by the at least one machine, causes the at least one machine to determine the first set of one or more data storage devices affected by the hostile environmental event comprises machine executable code to determine that the first set of one or more data storage devices is proximate to a sensor that detected the hostile environmental event and that the second set of one or more data storage devices is not proximate to the sensor.

* * * * *